United States Patent
Hart

(10) Patent No.: US 9,148,752 B2
(45) Date of Patent: Sep. 29, 2015

(54) SCALABLE MULTI-CHANNEL RANGING

(71) Applicant: Cisco Technology, Inc., San Jose, CA (US)

(72) Inventor: Brian D. Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 88 days.

(21) Appl. No.: 13/855,278

(22) Filed: Apr. 2, 2013

(65) Prior Publication Data

US 2014/0295877 A1 Oct. 2, 2014

(51) Int. Cl.
*H04W 64/00* (2009.01)
*H04W 4/02* (2009.01)

(52) U.S. Cl.
CPC ............. *H04W 4/02* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 7,710,321 B2 * | 5/2010 | Heidari-Bateni et al. | .... 342/458 |
| 8,179,816 B1 | 5/2012 | Vaidyanathan et al. | |
| 8,265,011 B2 | 9/2012 | Sugar et al. | |
| 2007/0018891 A1 * | 1/2007 | Golden et al. | ................. 342/420 |
| 2011/0177828 A1 * | 7/2011 | Bocquet et al. | ............ 455/456.1 |
| 2012/0275320 A1 * | 11/2012 | Iyer | ................................ 370/252 |
| 2014/0187259 A1 * | 7/2014 | Kakani et al. | ............... 455/456.1 |

OTHER PUBLICATIONS

Lindskog, et al., "Client Positioning using Timing Measurements between Access Points," IEEE 802.11-13/007r1, Jan. 15, 2013, pp. 1-13.

* cited by examiner

*Primary Examiner* — Charles Appiah
*Assistant Examiner* — Margaret G Mastrodonato
(74) *Attorney, Agent, or Firm* — Edell, Shapiro & Finnan, LLC

(57) ABSTRACT

Techniques are presented herein to coordinate ranging exchanges between base stations in order to enable any number of wireless devices in the vicinity of the base stations to obtain signals associated with ranging exchanges between base stations, time-of-departure report messages transmitted by the base stations to each other and time-of-arrival report messages transmitted by the base stations to each other, for use in computing the location of the wireless devices. Based on the multi-channel time-of-arrivals computed for the wireless device with respect to each base station, the multi-channel time-of-arrivals contained in the time-of-arrival report messages transmitted between base stations and the known locations of the base stations, a physical location is computed for the wireless device.

21 Claims, 8 Drawing Sheets

SCALABLE MULTI-CHANNEL RANGING

TECHNICAL FIELD

The present disclosure relates to wireless communication networks and devices.

BACKGROUND

In wireless networks, such as Wi-Fi™ wireless local area networks, one useful application is to determine the location of a wireless device (e.g., a client device). Accuracy in the location determination is important. Moreover, it is desirable to accurately locate a client device in a scalable manner and without undue complexity.

Time-based ranging techniques work best with a wider frequency bandwidth of the ranging signals. A wider bandwidth results in a narrower (more accurate) measurement time resolution.

DESCRIPTION OF EXAMPLE EMBODIMENTS

Overview

Figure 1:
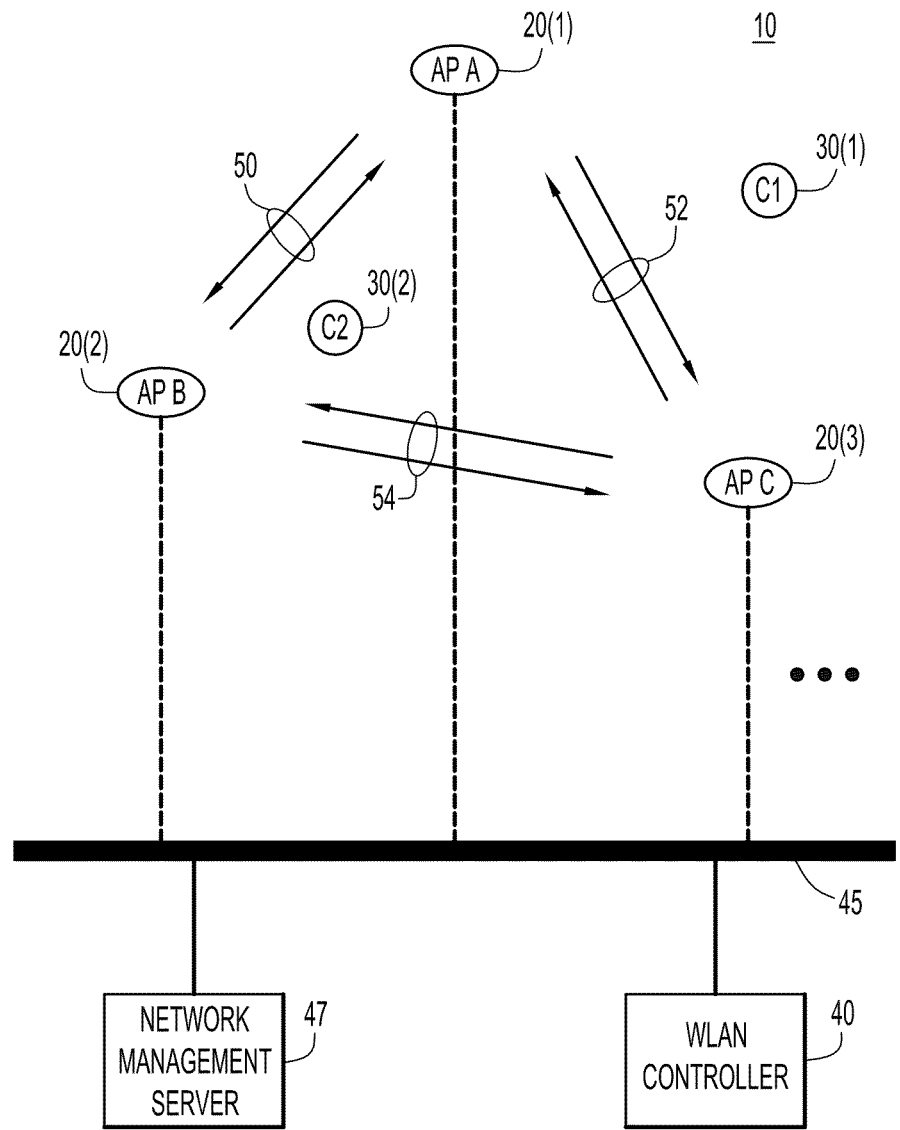
FIG. 1 is a system level diagram of a wireless network including a plurality of access points that make ranging exchanges on multiple channels to facilitate a multi-channel or wideband location computation for client devices.

Techniques are presented herein to facilitate the computation of a location of a wireless device (e.g., a client device) based on signals exchanged between other wireless devices (generically referred to as base stations, or more specifically access points) which are at known locations. The wireless device whose location is to be determined receives on each of multiple channels, ranging signals associated with ranging exchanges between the base stations and stores samples of received ranging signals associated with the ranging exchanges at the wireless device. The wireless device captures time-of-departure report messages transmitted between base stations. Each time-of-departure report message includes information indicating, for the base station that is the source of the time-of-departure report message: single-channel time-of-departures for ranging signals transmitted by the base station on respective ones of the multiple channels on which the ranging signals were each sent and the destination base station to which each ranging signal was sent. The wireless device computes multi-channel wireless channel responses between the wireless device and each of the base stations based on the stored samples of received ranging signals at the wireless device on each of the multiple channels and the time-of-departure report messages captured from the base stations. The wireless device computes multi-channel time-of-arrivals between the wireless device and each of the base stations based on the multi-channel wireless channel responses computed for the wireless device. The wireless device captures time-of-arrival report messages transmitted between base stations, each time-of-arrival report message including information representing multi-channel time-of-arrivals from received ranging signals during ranging exchanges on the multiple channels. Based on the multi-channel time-of-arrivals computed for the wireless device with respect to each base station, the multi-channel time-of-arrivals contained in the time-of-arrival report messages transmitted between base stations and the known locations of the base stations, a physical location is computed for the wireless device.

A process is also presented herein to coordinate the ranging exchanges between base stations in order to enable any number of wireless devices in the vicinity of the base stations to obtain signals associated with ranging exchanges between base stations, time-of-departure report messages and time-of-arrival report messages, for use in computing the location of the wireless devices.

Example Embodiments

Presented herein are techniques to facilitate highly accurate location determination of a wireless device based on signals exchanged between neighboring wireless devices. The techniques are described herein in connection with a wireless local area network, in which the wireless device whose location is to be determined is a wireless client device (also referred to herein as a "client") and the neighboring wireless devices are wireless access points (APs). This is only one example, and it should be understood that these techniques are applicable to any wireless network in which a wireless device can monitor signals exchanged between other wireless devices (e.g., more generally referred to as base stations and in other contexts as anchor nodes) that are at known locations. Moreover, these techniques are applicable to determining the location of base stations, e.g., APs as well.

Referring first to FIG. 1, a block diagram is shown of a wireless network 10 comprising a plurality of APs and clients. In the simplified example of FIG. 1, there are three APs 20(1), 20(2) and 20(3), also denoted "AP A", "AP B" and "AP C," respectively, and two clients 30(1) and 30(2), also denoted "C1" and "C2," respectively. In the example of FIG. 1, the clients 30(1) and 30(2) are within range of all of the APs 20(1)-20(3). In an actual network deployment, there may be numerous APs, and a given client may be within range of many more APs. Each of the APs 20(1)-20(3) may be controlled by a wireless local area network (WLAN) controller 40 to which they communicate via a wired local area network (e.g. mesh network) shown at reference numeral 45.

According to the techniques presented herein, the APs (or AP modules within other devices) switch radio frequency (RF) channels and exchange ranging packets with each other on each channel of a plurality of channels that span a frequency bandwidth. A ranging exchange is shown in FIG. 1 at reference numeral 50 between APs 20(1) and 20(2), at reference numeral 52 between APs 20(1) and 20(3) and at reference numeral 54 between APs 20(2) and 20(3). The APs 20(1)-20(3) publish a list of single channel (SC) time-of-departures of signals in the ranging exchanges, compute multi-channel time-of-arrivals from the ranging exchanges on the multiple channels, and publish the multi-channel (MC) time-of-arrivals.

A client (any client desiring to compute its location), e.g., client 30(1), follows in lock-step across the channels on which the ranging exchanges are made, capturing AP-to-AP ranging packets, and snooping SC time-of-departure reports sent between the APs typically at the end of the exchanges. The client computes MC time-of-arrivals with respect to its reception of the AP-to-AP ranging packets, and uses AP locations and AP-published time-of-arrival reports to compute its own location via a multi-lateration computation.

There is also a network management device 47 that performs overall network management of a wireless network. The network management device 47 may participate in coordinating the location procedures, e.g., scheduling of the ranging exchanges by the APs. In addition, the client device and or APs, may offload to the network management device 47 the location related computations described herein.

Figure 2:
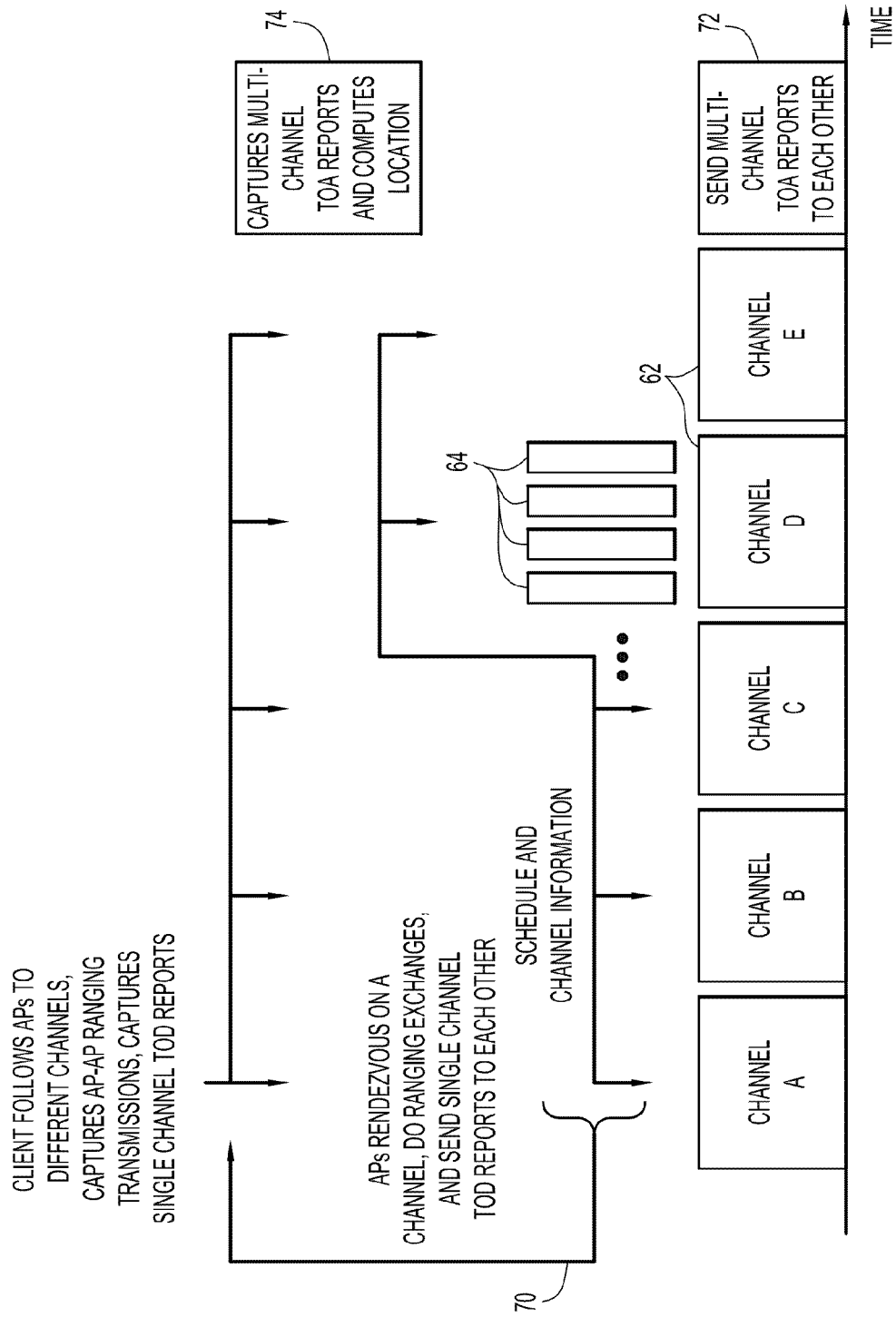
FIG. 2 is a flow diagram generally depicting the operations performed by the access points and client devices in the process presented herein.

Turning now to FIG. 2, a frequency bandwidth is spanned by a plurality of channels 62. Each channel 62 may be a single unit of bandwidth or may be comprised of multiple component channels such as those shown at reference numeral 64. Moreover, the channels 62 may have different bandwidths. The multiple channels 62 may contiguously span a spectrum/bandwidth of interest, possibly partially overlapping. APs rendezvous on a sequence of channels, make ranging exchanges, send a list of SC time-of-departures (TODs) in report messages to each other, and send multi-channel time-of-arrival (TOA) report messages to each other. As will become apparent from the following description, the TOD report messages include information indicating, for the AP that is the source of the TOD report message: the TOD of each ranging packet/signal transmitted by that AP, and channel identification information indicating the channel on which the ranging packet/signal was sent and information indicating the destination AP to which the ranging signal was sent. The MC TOA report messages transmitted between APs at 72 include information representing a MC TOA synthesized from the ranging exchanges and lists of SC TODs on the multiple channels.

The schedule and identification of channels to which the APs switch to perform the operations noted in FIG. 2 is generally identified/represented at reference numeral 70. This information is communicated to clients so that each client can move from channel to channel with the APs, and record samples for ranging packets received at the client from the ranging exchanges between APs. As well, the client captures the TOD report messages, and at 74 captures the MC TOA report messages sent between APs at 72, and ultimately computes its location or exports this information to another device where the client's location is computed from this information and the location is sent back to the client device or to some other destination. Multiple clients can perform this process in parallel and without any impact or influence on the processing performed by other clients. For simplicity, FIG. 2 (as well as subsequent figures) shows only a single client involved, but this is not meant to be limiting. In fact, it is one of several advantages of the techniques presented herein that numerous clients can be using the ranging exchanges between APs and related TOD and TOA reporting to independently determine or derive their locations.

Any of the APs may be configured to generate the schedule and channel identification information 70. Alternatively, the WLAN controller 45 (FIG. 1) may be configured to generate the schedule and channel identification information 70. In either case, each of the APs is made aware of the schedule and channel information either by way of an inter-AP message or a network management message received from the WLAN controller. Moreover, any client that is to participate in the location scheme is sent the schedule and channel information 70. For example, each AP, when it receives the schedule and channel information, may broadcast the schedule and channel information 70 in an appropriate network management message for all clients. In this way, any client that is currently being served by an AP will ultimately receive the schedule and channel information and be able to follow the APs as they switch from one channel to another. In one example, the ranging exchange consists of a Fine Timing Measurement frame (or other frame such as a vendor specific frame) followed by an acknowledgement (Ack) or Block Ack frame in accordance with the IEEE 802.11 communication standard (specifically 802.11mc Draft 1.0). However, for applications in 3G/4G/LTE cellular systems, the ranging exchanges would take different forms, which would be known to those of ordinary skill in the art.

Figure 3:
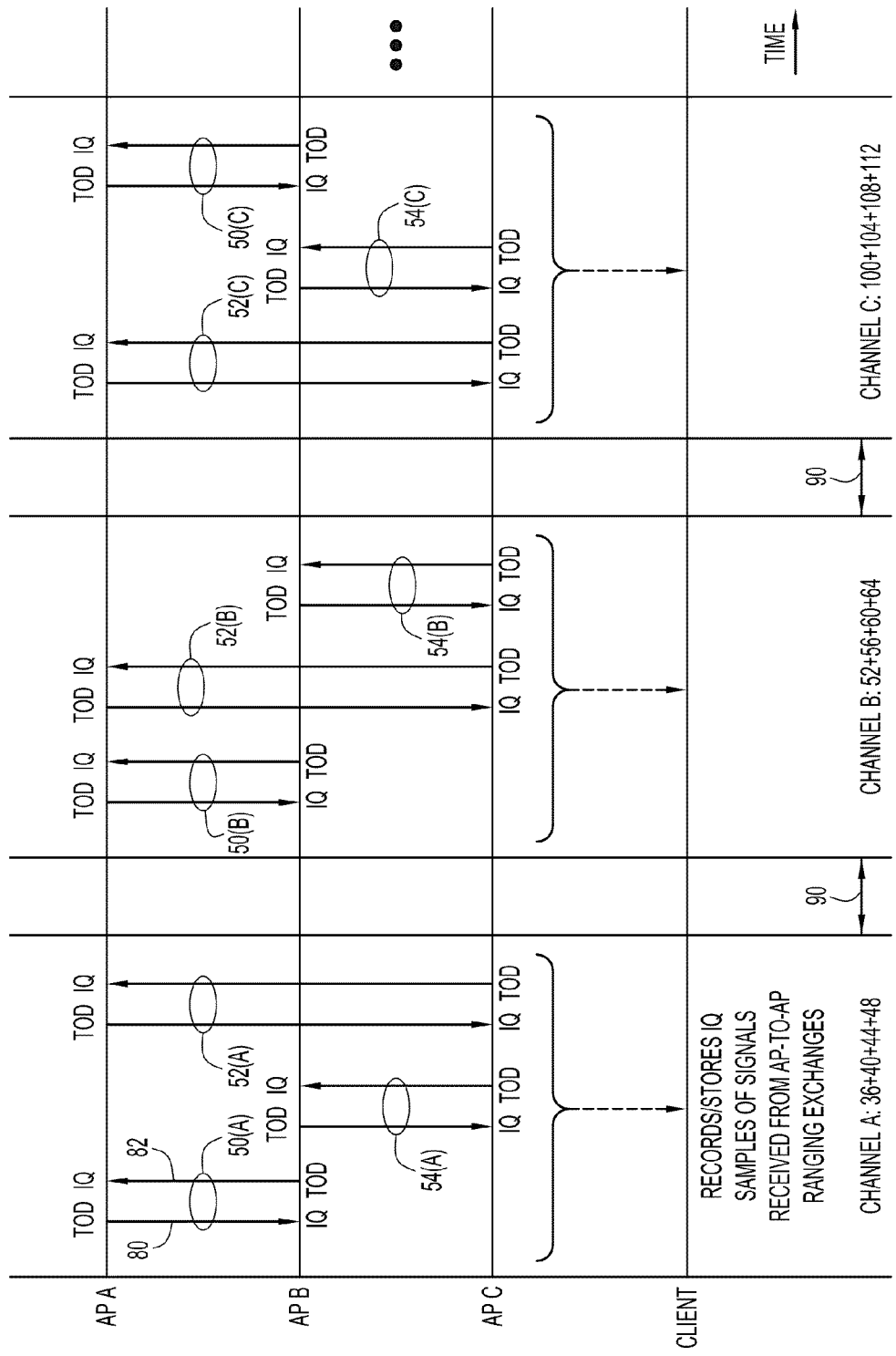
FIGS. 3-5 are flow diagrams that illustrate in more detail the operations performed by the access points and client devices in the process presented herein.
Figure 4:
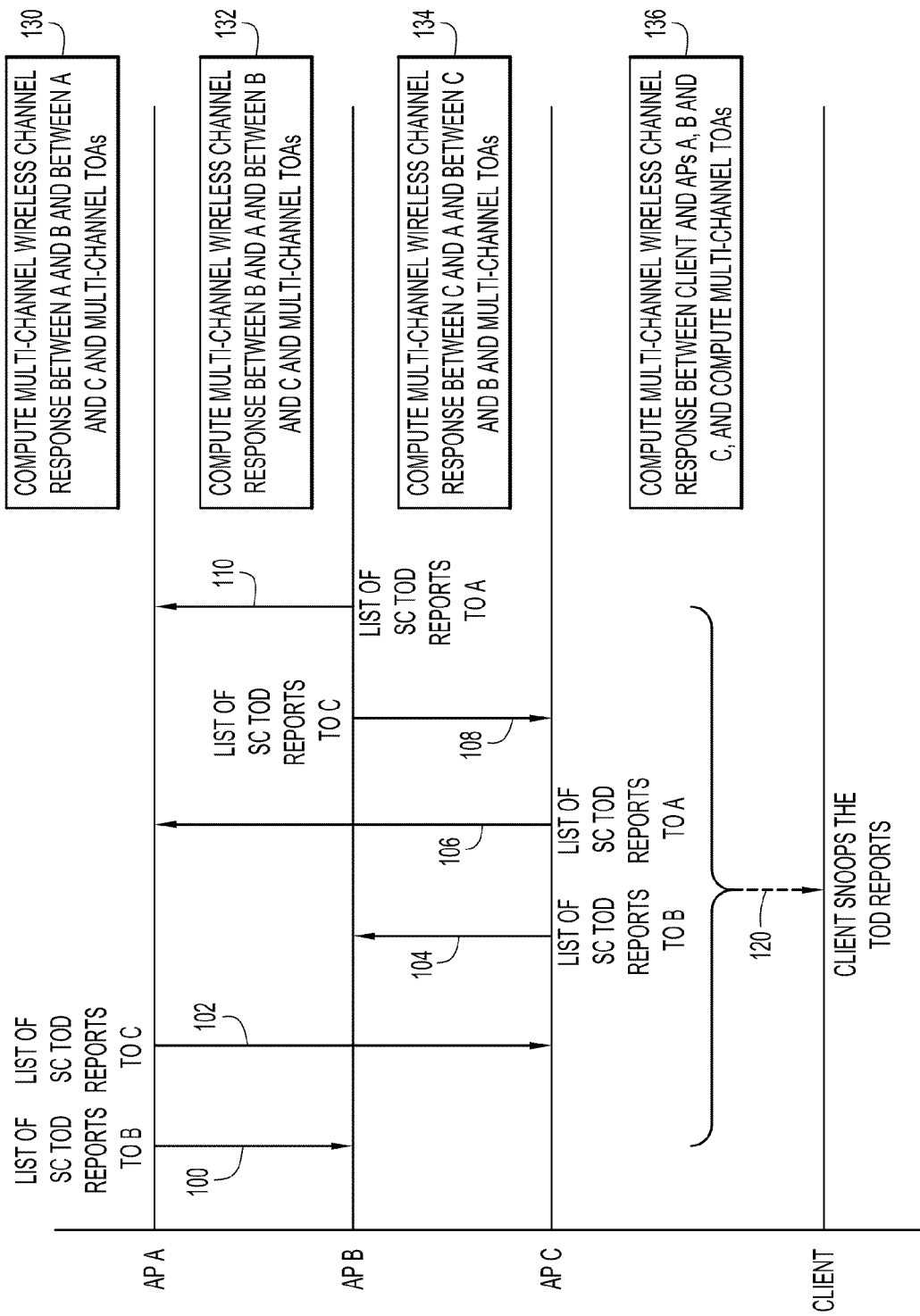
Figure 5:
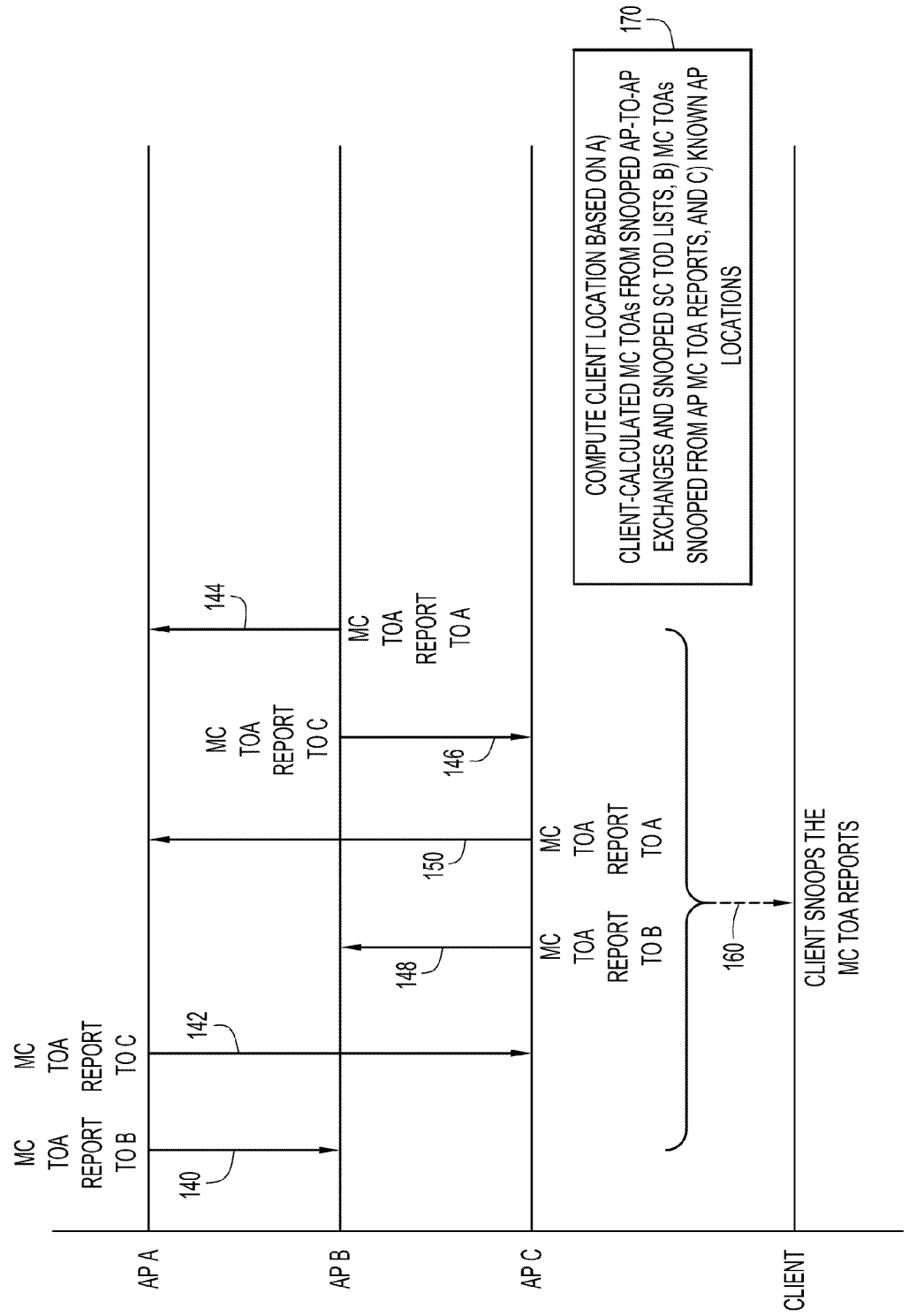

FIGS. 3-5 show the process is more detail. Referring first to FIG. 3, a diagram is shown of operations performed by APs that are in-range of each other. The APs may perform this process on-demand, or when they expect clients to be using the sequence of exchanges, when they detect clients that are capable of using the sequence of exchanges, or always. Again, the example of three APs is used, but this is not meant to be limiting. The APs (or a module within an AP box) are coarsely synchronized (e.g., at a millisecond scale). Every period, e.g. every N beacon intervals, N>=1 or every few seconds, at a scheduled time, each of these APs rendezvous at a common channel and performs a ranging exchange with each of its neighbors.

In the example of FIG. 3, the APs A, B and C initially rendezvous on Channel A. Channel A is, for example, a frequency bandwidth consisting of Channels 36+40+44+48 in the 5 GHz frequency band used by IEEE 802.11a/n/ac. In Channel A, the three APs engage in ranging exchanges shown at reference numerals 50(A), 52(A) and 54(A). A ranging exchange is, in the case of ranging exchange 50(A), for example, a packet from AP A to AP B then a response (e.g., Ack or Block Ack) from AP B to AP A. The other ranging exchanges 52(A) and 54(A) may be similar to that of ranging exchange 50(A).

The sequence of a ranging exchange is characterized by 4 timestamps: TOD of a packet from AP A (t1), TOA of that packet at AP B (t2), TOD of a response from AP B (t3), and TOA of that response at AP A (t4). The associated timestamps of each exchange that need to be transmitted are t1 and t4 (from AP A).

During these ranging exchanges (at different times on different channels), each participating AP records the TOD of any packet/signal it sends and the in-phase (I) and quadrature (Q) samples together with a timestamp value of the first recorded sample associated with reception of a ranging signal/packet from the other AP (or some portion thereof such as a portion of the preamble of the packet). The IQ data may be recorded in the time or frequency domain, before or after data modulation is removed. Once an AP has the list of SC TODs from a peer AP, the AP generates and stores a wireless channel estimate (impulse response) between itself and the peer AP from all received AP-to-peer-AP ranging packets and the SC TODs. The AP also generates and stores a reference time for the exchange, such as the first processed sample of the first AP-to-peer-AP exchange. The AP does this for each peer AP. Furthermore, the client generates and stores I and Q samples together with a timestamp value of the first recorded sample associated with reception of ranging packets sent between APs during the ranging exchanges. From the stored I and Q samples, the client generates a MC channel response estimate (impulse response) and a reference time for the wireless channel between the client and each of the respective APs. In general, for N APs that the client is snooping ranging transmissions from, the client records I and Q samples for N*(N−1)*#channels*2 AP transmissions. In the example described herein, N=3.

For example, in ranging exchange 50(A), AP A records the TOD of the outgoing packet 80 to AP B, records the I and Q samples together with a reference time for reception of the response packet 82 from AP B, or processes the I and Q samples and records a wireless channel response together with a reference time for the reception of the response packet 82 from AP B. Thus, in FIG. 3, "TOD" and "IQ" labels on the respective ends of the arrows shown in FIG. 2 for the ranging exchanges 50(A), 52(A) and 54(A) refer to the TOD of a packet/signal and the I and Q samples of a received packet/signal, respectively. It should be understood that while not separately denoted in FIG. 3, the IQ samples might be replaced by the wireless channel response estimate for the reception of that packet; but either are paired with a reference time. Typically, there are 3-10 neighbors per AP, and the ranging exchange is very short (e.g. 100 µs), such that these ranging exchanges consume between 1-10 milliseconds.

After an agreed time interval, all the APs rendezvous at the next common channel and repeat the ranging exchanges with each neighbor AP. This time interval is shown at 90 in FIG. 3 and serves as a guard time interval to account for any synchronization errors in the APs or clients when moving to the new channel Thus, in the example of FIG. 3, the APs next move to Channel B, which consists of the 5 GHz Channels 52+56+60+64. The ranging exchanges in Channel B are shown at reference numerals 50(B), 52(B) and 54(B). After the ranging exchanges in Channel B, the APs rendezvous in Channel C and perform ranging exchanges 50(C), 52(C) and 54(C). Channel C may consist of Channels 100+104+108+112 in the 5 GHz band. Note that the order of these ranging exchanges in Channel B need not be the same as in Channel A. The order of the ranging exchanges may randomly change from channel to channel due to contention etc.

This process repeats until all common channels are visited. For example, at the high end this could be 160 MHz (from Channels 36-64) then 80 MHz (Channels 100-112) then additional 80 MHz channels (Channels 116-128, Channels 132-144, Channels 149-161). As shown in FIG. 3, clients are aware of the schedule of the AP-to-AP ranging exchanges and switch channels with the APs in order to receive all AP-to-AP ranging transmissions, store I and Q samples and generate channel response information.

Reference is now made to FIG. 4. After all the ranging exchanges have been made on all the desired channels, in one embodiment the APs publish the list of SC TOD information stored from the ranging exchanges. (Note that the TOD information could be published for each channel before switching to the next channel, or published on the next channel for the previous channel and thus, the order of the processing phases shown in FIGS. 3-5 is not meant to be limiting.) The APs publish the TOD information by sending TOD report messages to each other. In one embodiment, AP A sends a TOD report message 100 to AP B and a TOD report message 102 to AP C. AP C sends a TOD report message 104 to AP B and a TOD report message 106 to AP A. AP B sends a TOD report message 108 to AP C and a TOD report message 110 to AP A. Alternatively, each AP may send its list of TOD information in a broadcast or multicast frame. Each TOD report message includes the TOD of the ranging signal transmitted by that AP, channel identification information indicating the channel on which the ranging signal was sent and information indicating the destination AP to which the ranging signal was sent and potentially other identifying information (such as a dialog token of the first ranging frame in an exchange). For example, TOD report messages 100 and 102 include, for each ranging signal sent by AP A: the TOD of the ranging signal, information indicating the channel on which that ranging signal was sent by AP A, and information indicating to which AP that ranging signal was sent. Similarly, the TOD report messages 104 and 106 sent by AP C include, for each ranging signal sent by AP C: the TOD of the ranging signal, information indicating the channel on which that ranging signal was sent by AP C, and information indicating to which AP that ranging signal was sent. Finally, TOD report messages 108 and 110 sent by AP B include: the TOD of the ranging signal, information indicating the channel on which that ranging signal was sent by AP B, and information indicating to which AP that ranging signal was sent.

As shown at reference numeral 120, the client device snoops (and decodes) the TOD report messages sent by the APs, and stores the information contained in the TOD report messages. The TOD report messages (containing the list of SC TODs) are designed to assist snooping, such as by being sent to a broadcast address, a well-known or locally configured multicast address, and being sent with known parsable fields (e.g. an Action management frame with known Category and Action fields).

Given the channel estimates recorded for reception of each ranging packet and the SC TODs, each AP and the client can "stitch" together in the frequency domain a wideband/multi-channel wireless channel estimate (impulse response) with respect to a nearby AP and compute a measure of the TOAs of the stitched multi-channel transmissions from the multi-channel wireless channel estimate (i.e., MC TOAs). Each AP performs this stitching computation and publishes a multi-channel TOA. This is complicated by clock offsets between APs and the client, which can be estimated in several ways (estimating the clock offset from the carrier offset recognizing that devices have locked baseband and carrier oscillators, estimating clock drift across multiple exchanges, etc). Once estimated, the IQ samples may be resampled or the TODs/TOAs scaled according to the estimated clock offsets.

Specifically, as shown in FIG. 4, at 130, AP A computes a multi-channel wireless channel response between it and AP B and a multi-channel wireless channel response between it and AP C using (a) the IQ samples or channel responses AP A stored for received ranging signals from APs B and C in each of the channels in which ranging exchanges were performed and (b) the lists of SC TODs (the TOD information received from APs B and C with respect to ranging signals sent by APs B and C during the ranging exchanges in each of the multiple channels). Furthermore, using the multi-channel wireless channel responses (with respect to APs B and C), AP A computes multi-channel TOAs from these multi-channel wireless channel responses stitched together from the received transmissions from APs B and C in each of the multiple channels.

Similarly, at 132, AP B computes a multi-channel wireless channel response between it and AP A and a multi-channel wireless channel response between it and AP C using (a) the IQ samples or channel responses AP B stored for received ranging signals from APs A and C in each of the multiple channels in which ranging exchanges were performed and (b) the lists of SC TODs (the TOD information received from APs A and C with respect to ranging signals sent by APs A and C during the ranging exchanges in each of the multiple channels). Using the multi-channel wireless channel responses (with respect to APs A and C), AP B computes multi-channel TOAs from these multi-channel wireless channel responses stitched together from the received transmissions from APs A and C in each of the multiple channels.

At 134, AP C computes a multi-channel wireless channel response between it and AP A and a multi-channel wireless channel response between it and AP B using (a) the IQ samples or the channel responses AP C stored for received ranging signals from APs A and B in each of the multiple channels in which ranging exchanges were performed and (b) the lists of SC TODs (the TOD information received from APs A and B with respect to ranging signals sent by APs A and B during the ranging exchanges in each of the multiple channels). Using the multi-channel wireless channel responses (with respect to APs A and B), AP C computes multi-channel TOAs from these multi-channel wireless channel responses stitched together from the received transmissions from APs A and B in each of the multiple channels.

Like the computations made by APs A, B and C, at 136, the client computes a multi-channel wireless channel response between it and AP A, a multi-channel wireless channel response between it and AP B, and a multi-channel wireless channel response between it and AP C using the IQ samples or channel responses the client stored for received ranging signals from APs A, B and C in each of the multiple channels in which ranging exchanges were performed and the TOD information snooped from the TOD report messages published by APs A, B and C to each other with respect to ranging signals sent by APs A, B and C during the ranging exchanges in each of the multiple channels. Using the multi-channel wireless channel responses (with respect to APs A, B and C, respectively), the client computes multi-channel TOAs from these multi-channel wireless channel responses stitched together from the received transmissions from APs A, B and C in each of the multiple channels.

The techniques to derive a multi-channel TOA from the ranging exchanges on the individual channels spanning the wideband frequency bandwidth is generally known in the art. However, a general description follows. The receiver (at each AP and the client device) digitally mixes the single-channel channel impulse responses to their known offset frequencies and sums them to produce a wideband channel impulse response. In an alternative embodiment the channel transfer functions are concatenated in the frequency domain (with zero-padding for edge tones where the channel transfer function (CTF) is unknown) and transformed to the time domain. In either embodiment, the multi-channel channel input response is processed to discern a first impulse. In a further embodiment, the raw IQ samples (i.e., with data modulation) of the known portion of the packets from each channel are mixed to their known offset frequencies and summed to compute a composite multi-channel measured signal. As well, the receiver computes a composite multi-channel reference signal corresponding to the known portion of the individual received single-channel waveforms (without accounting for multipath effects) mixed to their appropriate channel offset. The composite multi-channel measured signal is cross-correlated with the composite multi-channel reference signal (to identify the multipath channel), then the first-impulse is detected.

Reference is now made to FIG. 5 for the final phase of the process. At 140, AP A sends a TOA report message to AP B and at 142 sends a TOA report message to AP C. The TOA report message sent by AP A to AP B includes information representing the multi-channel TOA for ranging packets AP A received from AP B. Similarly, the TOA report message sent by AP A to AP C includes information representing the multi-channel TOA for ranging packets AP A received from AP C. At 144, AP B sends a TOA report message to AP A and at 146 AP B sends a TOA report message to AP C. The TOA report message sent by AP B to AP A includes information representing the multi-channel TOA for ranging packets AP B received from AP A. Similarly, the TOA report message sent by AP B to AP C includes information representing the multi-channel TOA for ranging packets AP B received from AP C. At 148, AP C sends a TOA report message to AP B and at 150 AP C sends a TOA report message to AP A. The TOA report message sent by AP C to AP B includes information representing the multi-channel TOA for ranging packets AP C received from AP B. Similarly, the TOA report message sent by AP C to AP A includes information representing the multi-channel TOA for ranging packets AP C received from AP A.

As shown at 160, the client snoops the TOA report messages sent between APs in order to capture the TOA information contained in those messages. Using the MC TOA information that the client obtained from the TOA report messages, at 170, a precise location for the client may be computed based further on the multi-channel TOA of multi-channel ranging transmissions stitched together from the received transmissions from APs A, B and C in each of the multiple channels and in turn on the TOD information associated with the inter-AP ranging transmissions contained in the TOD report messages that the client snooped at 120 in FIG. 4. More specifically, given the AP locations (which are known and can be sent in a management message to the client in advance), the TODs in the TOD report messages and the multi-channel TOA information in the TOA report messages, and its own estimated multi-channel TOA information with respect to ranging transmissions from nearby APs, there is sufficient information to calculate time difference of arrivals (TDOAs) between the client and nearby APs and then calculate its own location from the TDOAs. The TOA report messages are designed to assist snooping, such as by being sent to the broadcast address, a well-known or locally configured multicast address, and being sent with known parsable fields (e.g. an Action management frame with known Category and Action fields).

The computations made at operation 170 are based on location computation techniques known in the art for transmissions made in a single frequency channel. These same techniques may be used where the measurements made in a single frequency channel are replaced with the multi-channel TOA and related TODs, etc., as described above in connection with FIGS. 3-5. Consider the two-dimensional example where APs A, B and C are at known locations: (0,0), (0,b) and (c_x, c_y), respectively, and the client is located at (x,y). The simplistic differential difference equations that do not account well for measurement noise are:

$$R_{ab} = \sqrt{x^2 + y^2} - \sqrt{(x-b)^2 + y^2}$$

$$R_{ac} = \sqrt{x^2 + y^2} - \sqrt{(x-c_x)^2 + (x-c_y)^2} \text{, where}$$

$$c = \sqrt{c_x + c_y}$$

$$d = \frac{R_{ab}}{2} - \frac{b^2}{2R_{ab}}$$

$$e = \frac{b}{R_{ab}}$$

$$g = \frac{R_{ac}b}{R_{ab}c_y} - \frac{c_x}{c_y}$$

$$h = \frac{c^2 - R_{ac}^2 + R_{ac}R_{ab}\left(1 - \left(\frac{b}{R_{ab}}\right)^2\right)}{2c_y}$$

Two curves are defined:

$$\begin{cases} y = gx + h \\ y = \pm \sqrt{(e^2 - 1)x^2 + 2edx + d^2} \end{cases}$$

The location (x,y) of the client lies on the intersection of the two curves.

More sophisticated algorithms that account for multiple APs and/or measurement noise may be used. In one embodiment, first the area in which the client can be located is finely gridded. For each AP pair, a 2-dimensional array called a "heatmap" is defined that contains the predicted differential time of flight from a first AP to a second AP with respect to the client. The measured differential time-of-arrival between the two APs is calculated as:

(MC_TOA_from firstAP_atClient−(MC_TOA_from_secondAP_atClient−(MC_TOA_from_secondAP_atFirstAP−first_SC_TOD_from_firstAP_toSecondAP−timeOfFlightBetweenFirstandSecondAp)).

A metric is computed based on the squared difference between the heatmap (the predicted differential time of flight) and the measured differential time-of-arrival between the two APs, summed across each pair of APs, computed for each grid point. The result, E, can be visualized as a map of elevations where the lowest elevation represents the maximum likelihood location. Alternatively, the map of elevations can be converted to a probability map, assuming Gaussian measurement noise of variance $\sigma_n^2$, via the operation $\exp(-E^2/(2\sigma_n^2))$ up to an unimportant scalar. By taking the center of mass of the probability map, the client's minimum mean squared error (MMSE) location can be determined. As written, this is an $O(N^2)$ computation in the number of APs, but by rearranging terms the sum of squared errors across pairs of APs. this can be rearranged into an O(N) computation.

The following sets forth a mathematical description of the computation of a client device location using this heatmap technique.

APn transmits to APm at t1, mn (scalar), APm responds and is heard at APn at t4, mn (scalar). The time of flight between APm and APn is Tmn (scalar), between APm and client is Tmc (scalar), and between APn and client is Tnc (scalar). Client receives (hears) APm's and APn's transmissions at Umc and Unc, respectively (scalars).

A 2-dimensional (2D) array Hm called a heatmap is defined. Each entry of Hm corresponds to an XY location on an even grid. Each entry of Hm is the elapsed time for light to travel from APm to that entry's corresponding XY point—like Tmc if the client c were moved to each grid point in turn. Hn (2D array) is the time of flight from AP to grid points. Hmn=Hm-Hn (2D array). Hmn=Hm-Hn is the "reference".

The measurement from APn is Unc=t1+Tnc so Tnc=Unc−t1. The measurement from APm is Umc=t4−Tmn+Tmc so Tmc=Umc−t4+Tmn. Combining, Tmc−Tnc=Umc−Unc+t1, mn−t4,mn+Tmn (scalar).

Define t1,mn−t4,mn+Tmn=Xmn (scalar), this can be rewritten as Tmc−Tnc=Umc−Unc+Xmn (scalar).

The aforementioned metric is

M=SUM_m=1:nAP {SUM n=1:nAp (Hmn−(Umc−Unc+Xmn))$^2$}, which is a 2D array because Hmn is 2D. This is an O(nAp$^2$) calculation of the 2D Hmn array.

Expanding and rearranging, $M = \text{SUM\_m} =$ $1{:}nAP\{\text{SUM } n = 1{:}nAP((Hm - Umc) - (Hn - Unc) + Xmn)^2\} =$ $nAp * \text{SUM\_m} = 1{:}nAP(Hm - Umc)^2 + nAp * \text{SUM\_n} =$ $1{:}nAP(Hn - Unc)^2 + \text{SUM\_m} = 1{:}nAP\{\text{SUM } n = 1{:}nApXmn^2\} -$ $2 * \text{SUM\_m} = 1{:}nAP(Hm - Umc) * \text{SUM\_n} =$ $1{:}nAP(Hn - Unc) + 2 * \text{SUM\_m} =$ $1{:}nAP\{(Hm - Umc) * \text{SUM\_n} = 1{:}nAPXmn\} + 2 * \text{SUM\_n} =$ $1{:}nAP\{(Hn - Unc) * \text{SUM\_m} = 1{:}nAPXmn\}$ Note SUM n=1:nAp Xmn$^2$, SUM_m=1:nAP Xmn and SUM_n=1:nAP Xmn are scalar terms that can be computed very quickly. The summations over the heatmaps Hm and Hn are now only O(nAp) computations, providing significant complexity reduction.

As described above in connection with FIGS. 3-5, in one embodiment, the client may make all the necessary channel response estimate computations, multi-channel channel response computations, multi-channel TOA computations and ultimately location computations to determine its location from the information snooped from the inter-AP transmissions. In another embodiment, the client may offload the raw data it generates and obtains from snooping the inter-AP transmissions to another device, e.g., a network management server with location computation capability, so that the computations are made by another device on behalf of the client and the location computation result is sent back to the client device, or to some other destination.

Figure 6:
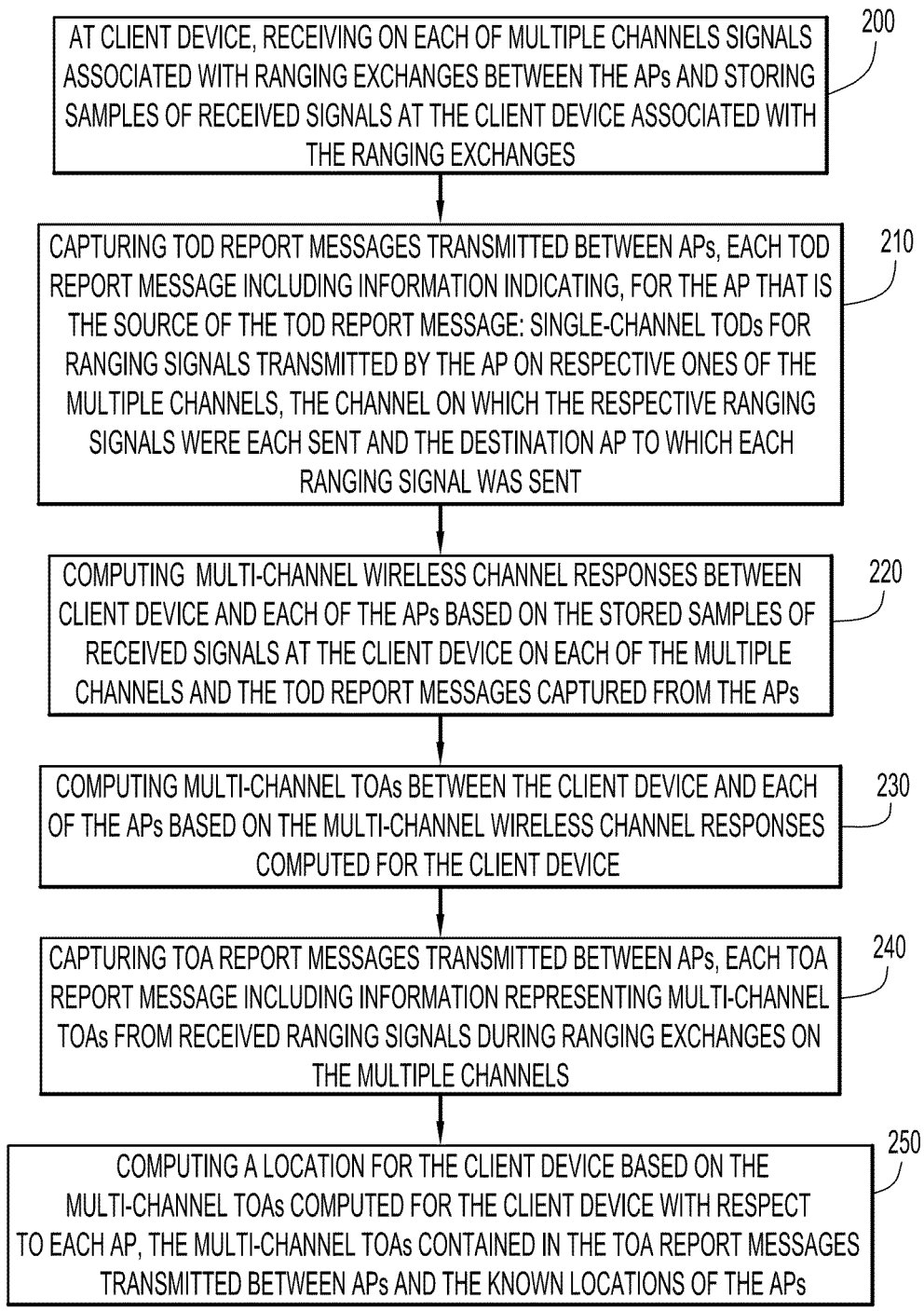
FIG. 6 is a flow chart generally depicting the operations performed in a client device to compute its location by snooping ranging exchanges between access points.

Turning to FIG. 6, a flow chart is provided that summarizes the operations performed to compute a location of a wireless device, e.g., a client device, according to the techniques presented herein. At 200, the client device receives on each of multiple channels signals associated with ranging exchanges between the APs and stores samples of received signals at the client device associated with the ranging exchanges. At 210, TOD report messages transmitted between APs are captured at the client device. Each TOD report message includes information indicating, for the AP that is the source of the TOD report message: single-channel TODs for ranging signals transmitted by the AP on respective ones of the multiple channels, and the channel on which the ranging signals were each sent and the destination AP to which each ranging signal was sent. As explained above, the TOD report messages may also include an identification of the frame transmitted by the respective APs during the ranging exchanges, the frame identification possibly being a dialog token. At 220, the client device computes a multi-channel wireless channel response between it and each of the APs based on the stored samples of received signals at the client device on each of the multiple channels and the TOD report messages captured from the APs. The computation of the multi-channel wireless channel response may involve correcting the TODs contained in the TOD report messages for clock offsets between the APs. At 230, the client device computes multi-channel TOAs between it and each of the APs based on the multi-channel wireless channel response computed for the client device. At 240, the client device captures TOA report messages transmitted between APs. Each TOA report message includes information representing multi-channel TOAs from received ranging signals during ranging exchanges on the multiple channels.

At 250, a location for the client device is computed based on the multi-channel TOAs computed for the client device with respect to each AP, the multi-channel TOAs contained in the TOA report messages transmitted between APs and the known locations of the APs. The location computation at 250 may involve correcting for clock offsets between the APs.

In a further embodiment, each AP-to-AP transmission per channel is sent via multiple antennas (e.g., sequentially switched through the AP antennas) with known modulated data across the signal bandwidth for each antenna. This enables the client device to compute the wireless channel response from each AP antenna. The client device can therefore compute the full multiple-input multiple-output (MIMO) multi-(frequency) channel wireless channel response with respect to each AP. The wireless device also computes a one-dimensional angle of arrival (typically azimuth) or a two-dimensional angle of arrival (typically azimuth and elevation, though this may be mapped to the XY plane instead) for the MIMO wireless channel impulse response at a first path of a multipath channel impulse response (i.e. the angle of arrival of the line-of-sight path). The angle of arrival may be represented as a probability distribution of angle-of-arrival (or XY position) instead of a single number. Thus, for this further embodiment in which MIMO capture is used, the client device may additionally use the angle of arrival information when computing its physical location. In summary, the wireless client device computes a full MIMO multi-channel wireless channel response with respect to each of the plurality of APs (base stations), computes an angle of arrival for a MIMO wireless channel response at a first path of a multipath channel response, and computes its location based further on the angle of arrival.

Figure 7:
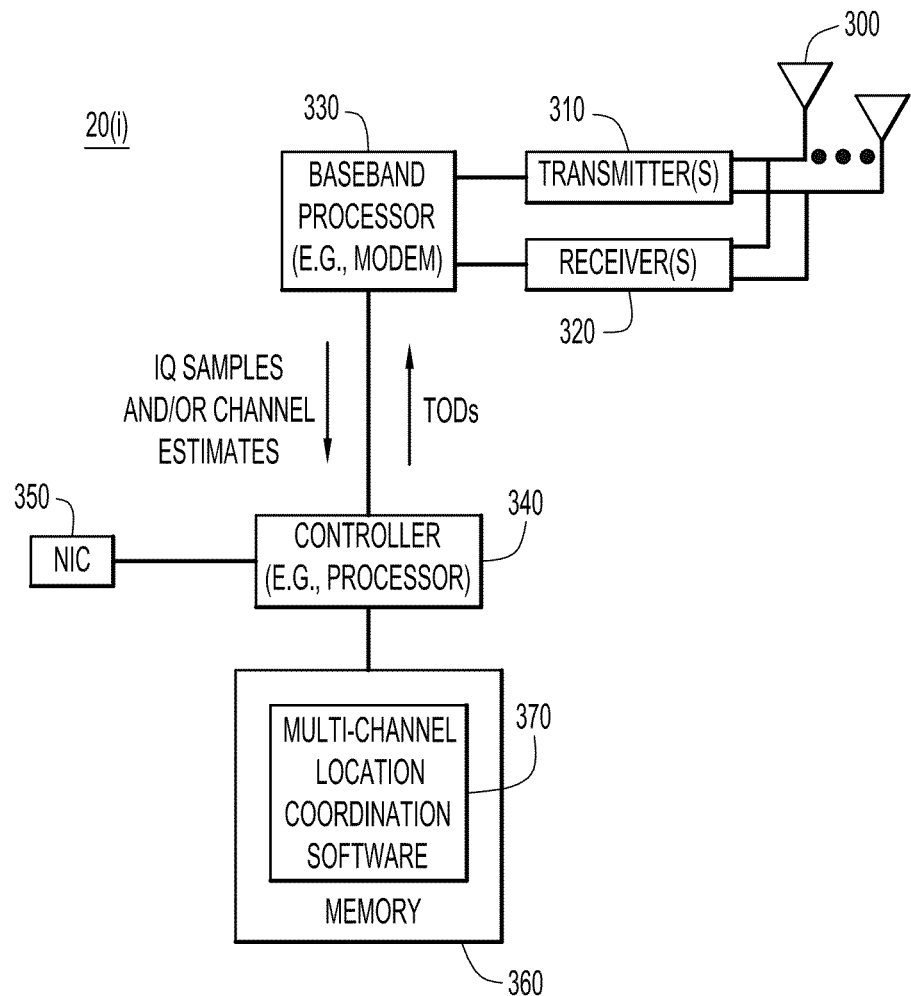
FIG. 7 is a block diagram of an access point configured to participate in the process presented herein.
Figure 8:
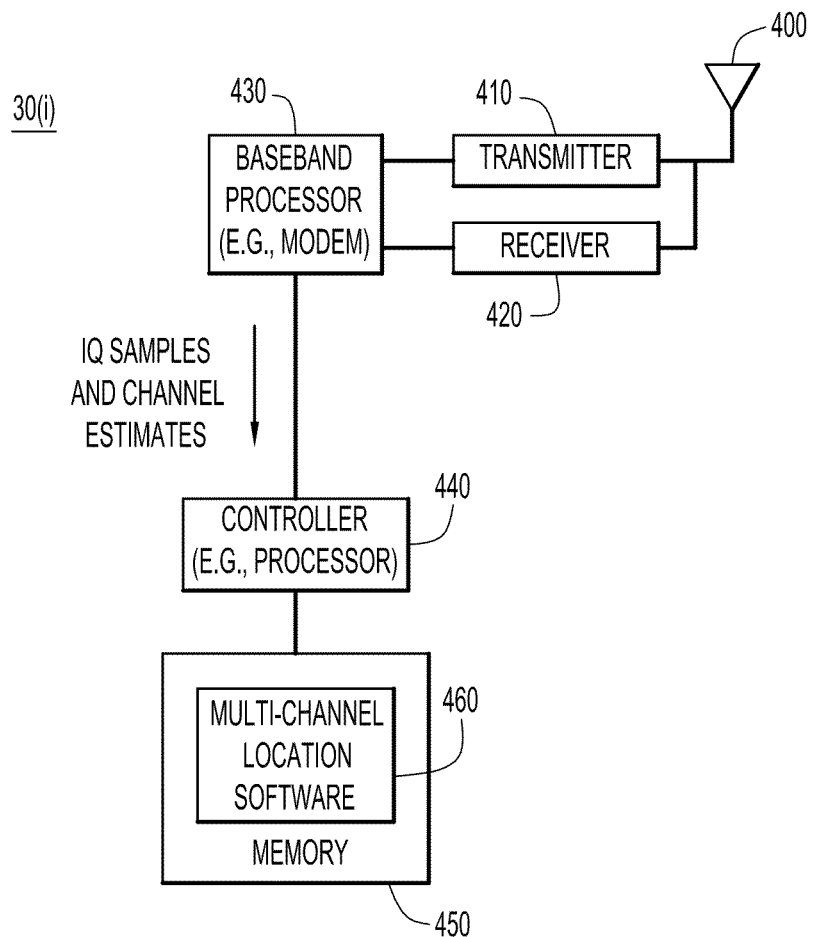
FIG. 8 is a block diagram of a client configured to participate in the process presented herein.

FIGS. 7 and 8 illustrate examples of block diagrams of an AP and a client device configured to perform the operations presented herein. With reference first to FIG. 7, there are shown relevant components of an AP at reference numeral 20($i$). Reference numeral 20($i$) is used to generically refer to any of the APs shown in FIGS. 1-6. The AP 20($i$) includes one or more antennas 300, a transmitter (or bank of transmitters) 310, a receiver (or bank of receivers 320), a baseband processor 330 (e.g., a modem), a controller 340, a network interface card 350, and memory 360. In the case where the AP includes multiple antennas 300, then there may be a corresponding number of transmitters and a corresponding number of receivers. The baseband processor 330 performs baseband modulation and formatting of transmit signals that are supplied to the transmitter for upconversion and transmission via the antennas 300. Similarly, the baseband processor 330 performs baseband demodulating of signals received and downconverted by the receiver 320. To this end, the baseband processor 330 generates IQ samples and channel estimates from received signals, and supplies this data to the controller 340. In addition, the controller 340 may supply TOD information for outgoing transmissions, e.g., ranging packets, to be sent by the AP 20($i$). Alternatively, the baseband processor 330 may generate the TOD information for outgoing transmissions. The NIC 350 enables wired network, e.g., Ethernet, communications for the AP 20($i$).

The controller 340 may be a microprocessor or microcontroller, and executes software instructions stored in memory 360. The memory 360 stores multi-channel location coordination software 370 that, when executed by the controller 340, cause the controller 340 to perform control the operations of the baseband processor 330 to perform the operations AP described above in connection with FIGS. 2-5.

Turning to FIG. 8, the block diagram of a client device is now described. The client device, shown generically at reference numeral 30($i$), includes an antenna 400 (or multiple antennas), a transmitter 410, a receiver 420, a baseband processor (e.g., modem) 430, a controller 440 and memory 450. The baseband processor 430 performs baseband modulation and formatting of transmit signals that are supplied to the transmitter 410 for upconversion and transmission via the antenna 400. Similarly, the baseband processor 430 performs baseband demodulating of signals received and downconverted by the receiver 420. To this end, the baseband processor 330 generates IQ samples and channel estimates from received signals, and supplies this data to the controller 440. The memory 450 stores software instructions for multi-channel location software 460 that, when executed by the controller 440, cause the controller 440 to perform the client operations described above in connection with FIGS. 2-5.

For example, the controller 450 controls the receiver (via the baseband processor 430 or directly) to receive ranging exchanges between APs on one channel, wait a period of time, and thereafter receive ranging exchanges between APs on another channel. This reception control is based on the received schedule and identification information of the channels in which the ranging exchanges between APs are to be made, and as described above, is also used to capture time-of-departure report messages and time-of-arrival report messages transmitted between APs.

Memory 360 and 450 shown in FIGS. 7 and 8 may comprise read only memory (ROM), random access memory (RAM), magnetic disk storage media devices, optical storage media devices, flash memory devices, electrical, optical, or other physical/tangible memory storage devices. Thus, in general, the memory 360 and 450 may comprise one or more tangible (non-transitory) computer readable storage media (e.g., a memory device) encoded with software comprising computer executable instructions and when the software is executed (by a processor) it is operable to perform the operations described herein In summary, techniques are presented herein in which APs (or AP modules) switch channels, exchanging ranging packets on each channel, computing multi-channel TOAs, and publishing the TODs and time-of-arrivals. Clients follow in lock step across the channels, capturing AP-to-AP ranging packets, snooping TODs sent by APs, and compute TOAs of the AP-to-AP ranging packets. Using knowledge of the AP locations and AP-published TOAs, the location of the clients can be computed using various computations, such as multilateration.

The techniques presented herein result in a highly accurate location determination with minimal overhead, and are highly scalable across multiple client devices simultaneously. There is no need to take one or more APs off-channel to locate one client, as many current location schemes require. Once clients have the AP locations (and maps and points of interest, which could be downloaded by clients ahead of time) there is no client traffic needed for the clients to determine their locations. This is very advantageous for low latency turn-by-turn navigation in stadiums, conference venues, higher education venues, etc. Moreover, by synthesizing a wide bandwidth set of data from ranging exchanges in multiple channels that span a wide bandwidth, higher location accuracy can be achieved from the resulting TOD and TOA data.

Thus, in summary, from the perspective of a wireless device whose location is to be computed, a method is provided comprising: at a wireless device operating in a wireless network that includes a plurality of wireless base stations at known locations, receiving on each of multiple channels, ranging signals associated with ranging exchanges between the base stations and storing at the wireless device samples of received ranging signals associated with the ranging exchanges; capturing time-of-departure report messages transmitted between base stations, each time-of-departure report message including information indicating, for the base station that is the source of the time-of-departure report message: single-channel time-of-departures for ranging signals transmitted by the base station on respective ones of the multiple channels on which the ranging signals were each sent and the destination base station to which each ranging signal was sent; computing multi-channel wireless channel responses between the wireless device and each of the base stations based on the stored samples of received ranging signals at the wireless device on each of the multiple channels and the time-of-departure report messages captured from the base stations; computing multi-channel time-of-arrivals between the wireless device and each of the base stations based on the multi-channel wireless channel responses computed for the wireless device; capturing time-of-arrival report messages transmitted between base stations, each time-of-arrival report message including information representing multi-channel time-of-arrivals from received ranging signals during ranging exchanges on the multiple channels; and computing a location for the wireless device based on the multi-channel time-of-arrivals computed for the wireless device with respect to each base station, the multi-channel time-of-arrivals contained in the time-of-arrival report messages transmitted between base stations and the known locations of the base stations.

Similarly, from the perspective of a wireless device whose location is to be computed, an apparatus is provided comprising: a receiver configured to receive wireless signals including signals transmitted between base stations as part of ranging exchanges between the base stations; a memory configured to store data derived from reception of wireless signals by the receiver; and a controller coupled to the receiver. The controller is configured to: control the receiver to receive on each of multiple channels, ranging signals associated with ranging exchanges between the base stations; store in the memory samples of received ranging signals associated with the ranging exchanges; extract from received time-of-departure report messages transmitted between base stations, information indicating, for the base station that is the source of the time-of-departure report message: single-channel time-of-departures for ranging signals transmitted by the base station on respective ones of the multiple channels the channel on which the ranging signals were each sent and the destination base station to which each ranging signal was sent; compute multi-channel wireless channel responses with respect to each of the base stations based on the stored samples of received ranging signals on each of the multiple channels and the time-of-departure report messages; compute multi-channel time-of-arrivals with respect to each of the base stations based on the multi-channel wireless channel responses; extract from received time-of-arrival report messages transmitted between base stations information representing multi-channel time-of-arrivals from received ranging signals during ranging exchanges on the multiple channels; and compute a location for the apparatus based on the multi-channel time-of-arrivals computed with respect to each base station, the multi-channel time-of-arrivals contained in the time-of-arrival report messages and known locations of the base stations.

From the perspective of a base station that is participating in the process described herein, a method is provided comprising: at a first base station operating in a wireless network, on each of multiple channels performing ranging exchanges with each of a plurality of other base stations and storing samples of received ranging signals associated with the ranging exchanges; sending from the first base station time-of-departure report messages including information indicating: single-channel time-of-departures for ranging signals transmitted by the first base station on respective ones of the multiple channels, the channel on which the ranging signals were each sent and the destination base station to which each ranging signal was sent; receiving time-of-departure report messages from each of the plurality of other base stations; computing a multi-channel wireless channel responses between the first base station and each of the plurality of other base stations based on the stored samples of received ranging signals on each of the multiple channels and the time-of-departure report messages received from the each of the plurality of other base stations; computing multi-channel time-of-arrivals between the base station and each of the plurality of other base stations based on the multi-channel wireless channel responses; and sending time-of-arrival report messages to each of the plurality of other base stations, each time-of-arrival report message including information representing multi-channel time-of-arrivals from received ranging signals during ranging exchanges on the multiple channels.

The above description is intended by way of example only.

What is claimed is:

1. A method comprising:
   at a wireless device operating in a wireless network that includes a plurality of wireless base stations at known locations, receiving on each of multiple channels, ranging signals associated with ranging exchanges between the base stations and storing at the wireless device samples of received ranging signals associated with the ranging exchanges;
   capturing time-of-departure report messages transmitted between base stations, each time-of-departure report message including information indicating, for the base station that is the source of the time-of-departure report message: a plurality of single-channel time-of-departures for respective ranging signals transmitted by the base station on respective ones of the multiple channels on which the ranging signals were each sent and the destination base station to which each ranging signal was sent;
   computing multi-channel wireless channel responses between the wireless device and each of the base stations based on the stored samples of received ranging signals at the wireless device on each of the multiple channels and the time-of-departure report messages captured from the base stations;
   computing multi-channel time-of-arrivals between the wireless device and each of the base stations based on the multi-channel wireless channel responses computed for the wireless device;
   capturing time-of-arrival report messages transmitted between base stations, each time-of-arrival report message including information representing a plurality of multi-channel time-of-arrivals from respective received ranging signals during ranging exchanges on the multiple channels; and
   computing a location for the wireless device based on the multi-channel time-of-arrivals computed for the wireless device with respect to each base station, the multi-channel time-of-arrivals contained in the time-of-arrival report messages transmitted between base stations and the known locations of the base stations,
   wherein the computing of the location comprises:
      calculating, between each pair of base stations, a squared difference between a predicted differential time of flight between the pair of base stations with respect to the wireless device and a measured differential time-of-arrival between the pair of base stations;

summing the squared differences across each pair of base stations;

repeating the calculating and the summing for each of a plurality of grid points;

modeling results of the calculating, summing, and repeating as a probability map over the plurality of grid points; and identifying the location of the wireless device as the center of mass of the probability map.

2. The method of claim 1, wherein receiving comprises receiving ranging signals associated with ranging exchanges between base stations on one channel, waiting a period of time, and thereafter receiving ranging signals associated with ranging exchanges between base stations on another channel.

3. The method of claim 2, further comprising receiving at the wireless device from at least one of the base stations a message indicating a schedule and identification of the channels in which the ranging exchanges between base stations are to be made.

4. The method of claim 3, further comprising the wireless device switching channels of a receiver in accordance with the schedule in order to receive ranging signals associated with ranging exchanges between base stations on each of the multiple channels and capture time-of-departure report messages and multi-channel time-of-arrival report messages transmitted between base stations.

5. The method of claim 1, wherein the multiple channels contiguously span a frequency band of interest.

6. The method of claim 5, wherein the multiple channels partially overlap.

7. The method of claim 1, wherein computing the multi-channel wireless channel responses comprises correcting for clock offsets between the base stations, and computing the location of the wireless device comprises correcting for clock offsets between the base stations.

8. The method of claim 1, further comprising computing a full multiple-input multiple-output (MIMO) multi-channel wireless channel response with respect to each of the plurality of base stations, computing an angle of arrival for a MIMO wireless channel response at a first path of a multipath channel response, and wherein computing the location is based further on the angle of arrival.

9. An apparatus comprising:
a receiver configured to receive wireless signals including signals transmitted between base stations as part of ranging exchanges between the base stations;
a memory configured to store data derived from reception of wireless signals by the receiver; and
a controller coupled to the receiver, wherein the controller is configured to:
control the receiver to receive on each of multiple channels, ranging signals associated with ranging exchanges between the base stations;
store in the memory samples of received ranging signals associated with the ranging exchanges;
extract from received time-of-departure report messages transmitted between base stations, information indicating, for the base station that is the source of the time-of-departure report message: a plurality of single-channel time-of-departures for respective ranging signals transmitted by the base station on respective ones of the multiple channels the channel on which the ranging signals were each sent and the destination base station to which each ranging signal was sent;

compute multi-channel wireless channel responses with respect to each of the base stations based on the stored samples of received ranging signals on each of the multiple channels and the time-of-departure report messages;

compute multi-channel time-of-arrivals with respect to each of the base stations based on the multi-channel wireless channel responses;

extract from received time-of-arrival report messages transmitted between base stations information representing a plurality of multi-channel time-of-arrivals from respective received ranging signals during ranging exchanges on the multiple channels; and compute a location for the apparatus based on the multi-channel time-of-arrivals computed with respect to each base station, the multi-channel time-of-arrivals contained in the time-of-arrival report messages and known locations of the base stations, wherein the computing of the location comprises:
calculating, between each pair of base stations, a squared difference between a predicted differential time of flight between the pair of base stations with respect to the apparatus and a measured differential time-of-arrival between the pair of base stations;

summing the squared differences across each pair of base stations;

repeating the calculating and the summing for each of a plurality of grid points;

modeling results of the calculating, summing, and repeating as a probability map over the plurality of grid points; and identifying the location of the apparatus as the center of mass of the probability map.

10. The apparatus of claim 9, wherein the controller is configured to control the receiver to switch channels based on a received message indicating a schedule and identification of the channels in which the ranging exchanges between base stations are to be made in order to receive ranging signals associated with ranging exchanges between base stations on each of the multiple channels and capture time-of-departure report messages and multi-channel time-of-arrival report messages transmitted between base stations.

11. The apparatus of claim 9, wherein the controller is configured to compute the multi-channel wireless channel responses by correcting for clock offsets between the base stations, and to compute the location by correcting for clock offsets between the base stations.

12. The apparatus of claim 9, wherein the controller is configured to control the receiver to switch to each of the multiple channels which contiguously span a frequency band of interest.

13. The apparatus of claim 9, wherein the receiver is further configured to receive, from at least one of the base stations, a message indicating a schedule and identification of the channels in which the ranging exchanges between base stations are to be made.

14. The apparatus of claim 9, wherein the controller is further configured to compute a full multiple-input multiple-output (MIMO) multi-channel wireless channel response with respect to each of the plurality of base stations, computing an angle of arrival for a MIMO wireless channel response at a first path of a multipath channel response, and wherein computing the location is based further on the angle of arrival.

15. The apparatus of claim 12, wherein the multiple channels partially overlap.

16. One or more non-transitory computer readable storage media encoded with software comprising computer executable instructions that, when the software is executed, are operable to:
- in a wireless device operating in a wireless network that includes a plurality of wireless base stations at known locations, receive on each of multiple channels, ranging signals associated with ranging exchanges between the base stations and storing at the wireless device samples of received ranging signals associated with the ranging exchanges;
- capture time-of-departure report messages transmitted between base stations, each time-of-departure report message including information indicating, for the base station that is the source of the time-of-departure report message: a plurality of single-channel time-of-departures for respective ranging signals transmitted by the base station on respective ones of the multiple channels on which the ranging signals were each sent and the destination base station to which each ranging signal was sent;
- compute multi-channel wireless channel responses between the wireless device and each of the base stations based on the stored samples of received ranging signals at the wireless device on each of the multiple channels and the time-of-departure report messages captured from the base stations;
- compute multi-channel time-of-arrivals between the wireless device and each of the base stations based on the multi-channel wireless channel responses computed for the wireless device;
- capture time-of-arrival report messages transmitted between base stations, each time-of-arrival report message including information representing a plurality of multi-channel time-of-arrivals from respective received ranging signals during ranging exchanges on the multiple channels; and
- compute a location for the wireless device based on the multi-channel time-of-arrivals computed for the wireless device with respect to each base station, the multi-channel time-of-arrivals contained in the time-of-arrival report messages transmitted between base stations and the known locations of the base stations,
- wherein the instructions operable to compute the location comprise instructions operable to:
  - calculate, between each pair of base stations, a squared difference between a predicted differential time of flight between the pair of base stations with respect to the wireless device and a measured differential time-of-arrival between the pair of base stations;
  - sum the squared differences summed across each pair of base stations;
  - repeat the calculating and the summing for each of a plurality of grid points;
  - model results of the calculating, summing, and repeating as a probability map over the plurality of grid points; and
  - identify the location of the wireless device as the center of mass of the probability map.

17. The computer readable storage media of claim 16, wherein the instructions operable to receive the ranging signals are operable to receive ranging signals associated with ranging exchanges between base stations on one channel, wait a period of time, and thereafter receive ranging signals associated with ranging exchanges between base stations on another channel.

18. The computer readable storage media of claim 17, wherein the instructions are further operable to receive at the wireless device, from at least one of the base stations, a message indicating a schedule and identification of the channels in which the ranging exchanges between base stations are to be made.

19. The computer readable storage media of claim 16, wherein the multiple channels contiguously span a frequency band of interest.

20. The computer readable storage media of claim 16, wherein the instructions operable to compute the multi-channel wireless channel responses are operable to correct for clock offsets between the base stations, and to compute the location of the wireless device comprises correcting for clock offsets between the base stations.

21. The computer readable storage media of claim 16, further comprising instructions operable to compute a full multiple-input multiple-output (MIMO) multi-channel wireless channel response with respect to each of the plurality of base stations, compute an angle of arrival for a MIMO wireless channel response at a first path of a multipath channel response, and wherein the instructions operable to compute the location are operable to compute the location based further on the angle of arrival.

* * * * *